(12) United States Patent
Bengler

(10) Patent No.: US 7,424,309 B1
(45) Date of Patent: Sep. 9, 2008

(54) SYSTEM IN VEHICLES FOR MAKING A TELEPHONE CALL

(75) Inventor: Klaus-Josef Bengler, Regenstauf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1573 days.

(21) Appl. No.: 09/617,754

(22) Filed: Jul. 17, 2000

(30) Foreign Application Priority Data

Jul. 16, 1999   (DE) ................................ 199 33 326

(51) Int. Cl.
  *H04M 1/00* (2006.01)
(52) U.S. Cl. ................. 455/556.1; 455/557; 455/456.1; 455/456.5; 455/457; 455/566; 455/569.1; 455/569.2; 701/301; 701/118; 701/207; 701/208; 701/220; 701/223; 340/901; 340/903; 340/933; 340/934; 340/937; 340/995.1; 340/995.27
(58) Field of Classification Search ................. 455/427, 455/456, 457, 556, 557, 41.1–2, 456.1–6, 455/458, 556.1–2, 575.1, 9, 90.1–3, 344–345, 455/566–567, 569.1–2; 340/505, 901–905, 340/933–943, 995.1, 995.11–19, 995.2, 995.21–28; 701/207–273, 300–301, 117–119
See application file for complete search history.

(56) References Cited

U.S. PATENT DOCUMENTS

| | | | |
|---|---|---|---|
| 5,726,660 A | 3/1998 | Purdy et al. | 342/357 |
| 5,806,005 A * | 9/1998 | Hull et al. | 455/566 |
| 6,122,521 A * | 9/2000 | Wilkinson et al. | 455/457 |
| 6,125,326 A * | 9/2000 | Ohmura et al. | 701/213 |
| 6,317,039 B1 * | 11/2001 | Thomason | 340/505 |
| 6,405,132 B1 * | 6/2002 | Breed et al. | 701/301 |

FOREIGN PATENT DOCUMENTS

| | | |
|---|---|---|
| DE | 36 19 824 | 12/1987 |
| DE | 40 23 952 | 2/1992 |
| DE | 44 25 567 | 2/1996 |
| DE | 195 44 921 | 7/1996 |
| DE | 196 04 716 | 8/1997 |
| DE | 197 02 363 | 7/1998 |
| DE | 197 30 794 | 1/1999 |
| DE | 197 33 579 | 2/1999 |
| DE | 197 36 774 | 2/1999 |
| DE | 19736675 A1 | 2/1999 |
| DE | 197 38 764 | 3/1999 |
| DE | 197 41 896 | 4/1999 |
| DE | 197 43 306 | 4/1999 |
| DE | 198 11 011 | 9/1999 |

* cited by examiner

*Primary Examiner*—Tuan Tran
(74) *Attorney, Agent, or Firm*—Crowell & Moring LLP

(57) ABSTRACT

A system for making a telephone call in a vehicle in which information concerning the traffic situation of a first vehicle is electronically processed and sent to a second vehicle. By apparatuses of further electronic processing, only relevant information concerning the traffic situation, which is in the field of view of the device of the first vehicle, is transmitted to the receiving party together with the telephone conversation. Unimportant details of the environment are able to be suppressed.

12 Claims, 2 Drawing Sheets

SYSTEM IN VEHICLES FOR MAKING A TELEPHONE CALL

BACKGROUND AND SUMMARY OF THE INVENTION

This application claims the priority of German application 19933326.2, filed Jul. 16, 1999, the disclosure of which is expressly incorporated by reference herein.

The invention relates to a system in vehicles for making a telephone call.

During telephone calls which are made in a vehicle, only acoustic information has so far been transmitted between the conversation partners. In contrast, various video telephones already exist for the operation in the fixed network, which video telephones emit speech as well as image information.

Telephone conversations in the vehicle considerably tie up the driver's attention and can lead to dangerous traffic situations. One reason is that the external conversation partner does not know the actual traffic situation, which does not permit him to adapt his conversation behavior correspondingly. If the conversation were to take place within the automobile the other party would not ask stressful questions because he would understand the traffic situation. However, a remote second party frequently asks the driver to make statements in stressful situations because he does not know of the stressful situation.

When using image telephony, which is known per se (compare German Patent Document DE 197 36 675 A), in a vehicle, there is the additional problem of a frequently absent transmission capacity.

It is therefore an object of the invention to provide a system of the initially mentioned type by means of which it is possible to transmit information important to the receiving party concerning the actual situation of a conversation partner sitting in a vehicle.

The driver is permitted to add the visual transmission of the traffic situation via video telephony to the telephone call connection, as a supplement to the speaking channel. If the driver's conversation partner has a video telephone, the actual traffic situation is schematically transmitted to the driver's conversation partner.

During the implementation of the invention, the quantity of data of the image taken by means of the image acquisition device is reduced in the vehicle.

The image information can be generated completely without any image acquisition device relying only on information obtained inside the vehicle by means of an already existing navigation system. This navigation system furnishes information concerning the type of the actually driven road and the adjacent roads. On the basis of this information, a schematic image of the environment is also generated inside the vehicle by means of conventional imaging devices. Here, changing environmental influences (rain, fog, darkness) have no influence on the quality of the schematic representation of the traffic situation which takes place in the style of graphic navigation information. In a supplementary manner, information of the vehicle sensor system, such as the ranging control system (furnishes information on preceding and oncoming vehicles) and a system for the detection of surrounding vehicles, can be integrated in the representation of the traffic situation.

The actualization of the display depends on the transmission possibilities. If required, a more schematic display can be accepted in favor of a higher actualization rate.

The acoustic information of the navigation system should preferably be slightly above threshold background information for the conversation partner in order to transmit information concerning imminent turn-off operations without disturbing the telephone conversation.

The necessary transmission capacity can be provided by a second synchronized transmission channel or an increased transmission capacity of a channel which, when the vehicle is stopped, can also be utilized for transmitting document information (writing, picture) in the sense of a teleconference.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
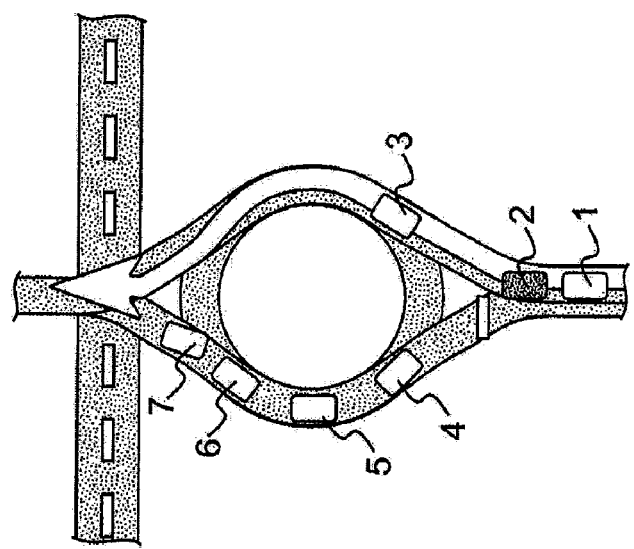
FIG. 1 provides a schematic illustration of a traffic situation as viewed by a distant second party to a conversation.

The traffic situation illustrated in FIG. 1 is an example of a video transmission sent to a second party in order to provide the second party with a realization of the traffic situation of the caller in vehicle 1. Reference numbers 2 and 3 correspond to preceding automobiles whereas reference 4-7 represent oncoming traffic. According to the present invention, this bird-eye view shown in FIG. 1, when presented to a second party to the call at a distant location, will provide the necessary information for that second party to comprehend that the first party needs to be paying close attention to his driving situation. This schematic of the actual traffic situation allows the second party to adjust the conversation accordingly to relieve or to avoid adding to the stress of the first party in vehicle 1.

Figure 2:
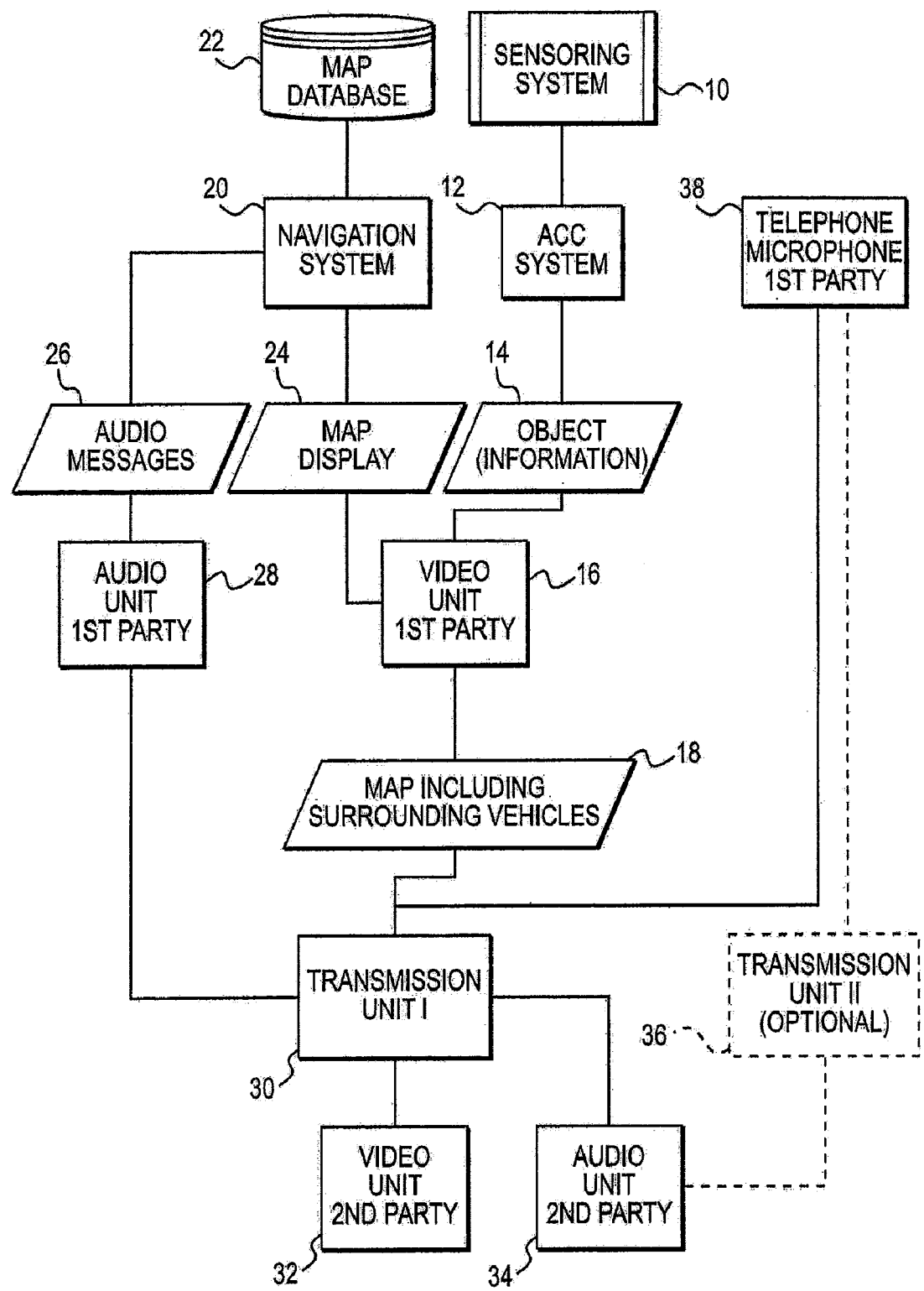
FIG. 2 is an example of a system arrangement for providing image and audio information to a distant second party according to the present invention. Video unit and sensing system.

The system of FIG. 2 provides an exemplary arrangement according to a preferred embodiment whereby a sensor system for surrounding vehicles (ACC) 12 includes the sensors 10 which provide object information 14 after being processed by the system 12. This onboard sensor system in vehicle 1 also includes a navigation system 20 having a map database 22 which provides a map display 24 to the video unit 16 which may be video telephone which receives information from the sensing system 12 and the navigation system 20 in order to provide a map 18 which includes surrounding vehicles. This visual map is shown, as an example, in FIG. 1, as discussed above. The visual map is sent through the transmission unit 30 to the video unit 32 in the distant second party vehicle. Additionally, the navigation system may include a series of audio messages 26 in order to transmit information concerning imminent turn off operations, for example. The acoustic information from these audio message 26 is fed through the audio unit 28 at an audio level which is slightly above the threshold background for the conversation partner. The microphone 38 establishes conversation level for the first party in vehicle 1. That is, the distant second party converses through audio unit 34 with the first party in vehicle 1 through the audio unit 28. When an audio message from the navigation system requires the driver to vehicle 1 to act immediately, the message is delivered slightly above the threshold background information of the conversation. The transmission unit 30 is a synchronized transmission channel for both the video and the audio with the audio transmission occurring both the distant second party and the first party in vehicle 1.

On the other hand, video information is only transmitted from the first party to the second distant party. In order to increase transmission capacity, it is possible to utilize a second synchronized transmission channel 36 to address the audio information from the second party to the first party through the microphone 38. With this arrangement, the driver of vehicle 1 is able to add visual information concerning the traffic situation.

It is also possible, according to a second embodiment, to provide information generated without any image acquisition device by relying only on information obtained inside the vehicle by means of an already existing navigation system 20. This type of system can furnish information concerning the type of road being driven on as well as the adjacent roads and, on that basis, a schematic of the environment can also be generated inside the vehicle and transmitted to the distant vehicle. Additionally, the system can be supplemented with information from vehicle sensor systems such as range and control system which detect location of the surrounding vehicle. Such supplementary ranging information can be added in addition to the navigation system or can be integrated into the representation of the traffic situation.

The conversation behavior of the conversation partner becomes more cooperative because of improved information concerning the actual traffic situation and takes into account the requirements of the driving task by pauses or reference to the traffic situation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communicating between a first party in a vehicle and a second external party, comprising the steps of:
    initiating a telephone conversation between said first and second party;
    preparing a depiction of an environment surrounding said vehicle;
    extracting, from said depiction, relevant information concerning a traffic situation in said environment;
    transmitting said relevant information to said second external party together with audio information from said telephone conversation.

2. The method according to claim 1, wherein said depiction is obtained by means of a preexisting navigation system on said vehicle.

3. The method according to claim 1, wherein said depiction is obtained by means of a sensor system on said vehicle.

4. The method according to claim 1, wherein said relevant information is updated periodically.

5. The method according to claim 4, wherein said periodic update occurs in time increments of several seconds.

6. The method according to claim 1, wherein said step of preparing a depiction includes the step of preparing an image of said environment surrounding said vehicle.

7. The method according to claim 1 wherein the step of preparing a depiction of an environment surrounding said vehicle include the steps of obtaining object information from a sensing system and obtaining map display information from a map database.

8. An arrangement for audio visual communication between a first party in a vehicle and a second external party, said arrangement comprising:
    on-board sensory system for providing information of an environment outside of said vehicle;
    extracting means for extracting portions of said information which are relevant to a traffic situation in said environment outside of said vehicle;
    audio visual communication system for simultaneously transmitting a telephone conversation between said first and second party and said extracted relevant information to said second external party.

9. The arrangement according to claim 8, wherein said sensory system is an image acquisition system for providing an image of the environment outside of the vehicle.

10. The arrangement according to 8 wherein said extracting means for extracting portions of said information which are relevant to a traffic situation includes a means to provide map information concerning the location of said vehicle and means for combining portions of said map information with said information of said environment outside of said vehicle.

11. An arrangement for communication between a first party in a vehicle and a second external party, said arrangement comprising:
    an automobile navigation system with a sensory system in said vehicle for providing traffic information concerning traffic in an environment outside of the vehicle;
    a communication device for simultaneously transmitting telephone conversation between said first and second party and said traffic information from said first party to said second party.

12. The arrangement according to claim 11 wherein said automobile navigation system includes a sensor means for providing object information and a navigation device for providing map display information.

* * * * *